US011126674B2

(12) United States Patent
Todasco

(10) Patent No.: US 11,126,674 B2
(45) Date of Patent: Sep. 21, 2021

(54) SOFT RECOMMENDATIONS

(71) Applicant: PayPal, Inc., San Jose, CA (US)

(72) Inventor: Michael Charles Todasco, Santa Clara, CA (US)

(73) Assignee: PAYPAL, INC., San Jose, CA (US)

(*) Notice: Subject to any disclaimer, the term of this patent is extended or adjusted under 35 U.S.C. 154(b) by 944 days.

(21) Appl. No.: 14/701,278

(22) Filed: Apr. 30, 2015

(65) Prior Publication Data

US 2016/0321364 A1 Nov. 3, 2016

(51) Int. Cl.
| | |
|---|---|
| *G06F 16/9535* | (2019.01) |
| *G06F 3/0484* | (2013.01) |
| *G06F 1/16* | (2006.01) |
| *H04N 21/25* | (2011.01) |
| *H04N 21/4788* | (2011.01) |
| *H04N 21/258* | (2011.01) |
| *G06F 3/01* | (2006.01) |

(52) U.S. Cl.
CPC .......... *G06F 16/9535* (2019.01); *G06F 1/163* (2013.01); *G06F 3/011* (2013.01); *G06F 3/04847* (2013.01); *H04N 21/252* (2013.01); *H04N 21/25891* (2013.01); *H04N 21/4788* (2013.01)

(58) Field of Classification Search
CPC .......... G06F 16/9535; G06F 3/04847
See application file for complete search history.

(56) References Cited

U.S. PATENT DOCUMENTS

| | | | |
|---|---|---|---|
| 6,907,566 B1* | 6/2005 | McElfresh | G06Q 30/02 705/14.43 |
| 6,983,331 B1* | 1/2006 | Mitchell | G06F 17/30905 707/E17.121 |
| 7,222,085 B2* | 5/2007 | Stack | G06Q 30/02 705/14.53 |
| 8,521,735 B1* | 8/2013 | Mourad | G06F 17/30867 707/732 |
| 8,606,792 B1* | 12/2013 | Jackson | H04L 51/32 707/748 |
| 9,430,131 B1* | 8/2016 | Zhang | G06F 3/04842 |
| 9,652,557 B2* | 5/2017 | Gross | G06F 17/3097 |
| 2005/0187891 A1* | 8/2005 | Johnson | G06F 11/202 |
| 2005/0216434 A1* | 9/2005 | Haveliwala | G06F 16/9535 |

(Continued)

*Primary Examiner* — Marc S Somers
(74) *Attorney, Agent, or Firm* — Haynes and Boone, LLP

(57) ABSTRACT

A system, a medium, and a method are provided to send soft recommendations to one or more devices. For example, a communication interface of a server device accesses request data generated by a first user account, where the request data includes soft recommend data intended for a second user account. A soft recommend component of the server device generates graphic data and determines one or more locations or display configurations of the second user account to provide the graphic data based on an estimated interest in the graphic data. An account management engine of the server device uploads the graphic data to the second user account based on the one or more locations of the second user account determined to provide the graphic data. A transceiver of the communication interface that transmits the uploaded graphic data to a client device enabled to access the second user account.

20 Claims, 10 Drawing Sheets

(56) References Cited

U.S. PATENT DOCUMENTS

| | | | | |
|---|---|---|---|---|
| 2006/0149622 A1* | 7/2006 | Baluja | G06Q 30/02 | 705/14.53 |
| 2006/0173838 A1* | 8/2006 | Garg | G06Q 30/02 | |
| 2006/0242554 A1* | 10/2006 | Gerace | G06Q 10/10 | 715/209 |
| 2008/0300958 A1* | 12/2008 | Gluck | G06Q 30/02 | 705/7.33 |
| 2009/0024489 A1* | 1/2009 | Baldua | G06Q 30/02 | 705/26.35 |
| 2009/0077062 A1* | 3/2009 | Spivack | G06Q 30/02 | |
| 2009/0300547 A1* | 12/2009 | Bates | G06F 16/954 | 715/825 |
| 2010/0106730 A1* | 4/2010 | Aminian | G06Q 10/10 | 707/748 |
| 2011/0161323 A1* | 6/2011 | Hagiwara | G06N 20/00 | 707/737 |
| 2011/0196922 A1* | 8/2011 | Marcucci | H04W 4/21 | 709/204 |
| 2011/0302531 A1* | 12/2011 | Takushima | G06Q 30/02 | 715/811 |
| 2012/0023191 A1* | 1/2012 | Kang | G06F 3/04842 | 709/217 |
| 2012/0144308 A1* | 6/2012 | Welingkar | G06Q 10/107 | 715/738 |
| 2012/0330758 A1* | 12/2012 | Kaushik | G06Q 30/0241 | 705/14.73 |
| 2013/0066710 A1* | 3/2013 | Zimak | G06F 17/30867 | 705/14.43 |
| 2013/0110848 A1* | 5/2013 | Svendsen | G06F 16/435 | 707/748 |
| 2013/0179761 A1* | 7/2013 | Cho | G06Q 10/20 | 715/202 |
| 2013/0239008 A1* | 9/2013 | Curtis | G06Q 10/00 | 715/738 |
| 2013/0297447 A1* | 11/2013 | Sakata | H04N 21/4826 | 705/26.7 |
| 2013/0318180 A1* | 11/2013 | Amin | G06Q 30/0251 | 709/206 |
| 2014/0075289 A1* | 3/2014 | Brant | G06F 17/217 | 715/234 |
| 2014/0075339 A1* | 3/2014 | Weskamp | H04L 65/403 | 715/753 |
| 2014/0278986 A1* | 9/2014 | Rouse | G06F 16/24578 | 705/14.54 |
| 2014/0297655 A1* | 10/2014 | Paglia | H04L 67/22 | 707/748 |
| 2015/0169557 A1* | 6/2015 | Ciordas | H04N 21/44222 | 707/609 |
| 2015/0242755 A1* | 8/2015 | Gross | G06Q 50/01 | 706/46 |
| 2016/0105387 A1* | 4/2016 | Jackson | H04W 4/21 | 709/206 |
| 2016/0117329 A1* | 4/2016 | Busey | G06F 16/24578 | 707/726 |

* cited by examiner

500

502

Top 10 Best New Musical Acts of the Year

504 
Smart Watches, the New Craze

506 
How to Efficiently Manage Your Computing Devices

508

510

512

Graphic Data 514

SOFT RECOMMENDATIONS

TECHNICAL FIELD

This disclosure generally relates to server devices and client devices electronically communicating data, and more particularly, to processing the data to improve displayed content.

BACKGROUND

With personalized magazines becoming increasingly more prevalent, an assortment of information may be curated for a particular user. Further, an account may be specifically tailored towards the user's interests such that various pieces of information are organized in a manner most fitting to the user's preferences. For example, a user's account may include a main portion of the account that includes an article on productivity, possibly describing activities that successful people do during their lunch breaks. A secondary portion of the user account may include articles on technology, innovation, and/or computing devices, among other possibilities.

In some instances, a given user may be connected to other users with possibly similar interests, thereby creating a valuable network of users sharing ideas. As such, a first user may send an article to other users so as to recommend certain types of information. Yet, various issues may arise with such recommendations. For example, consider the first user that sends to a second user the article describing the activities that successful people do during their lunch breaks. In some instances, the second user may not be interested in the article. However, in some instances, the second user may feel insulted by the article, possibly interpreting the sharing of the article as implying that the second user is unproductive or unsuccessful. In such instances, the second user may remove the connection with the first user, thereby hindering the growth of both of the users' networks.

In another scenario, the first user may want to share information based on a major breakthrough, possibly where the first user was awarded a prize or a grant. Yet, the first user may be reluctant to send the information to other users, where doing so may reflect poorly on the first user's character, as possibly reflecting the first user is boasting to other users about the first user's accolades. As such, the information may be delayed to the other users or in some instances, the other users may not receive the information. Even further, various informational technologies addressing such issues have been proven ineffective. For example, technology enabling users to send information anonymously has its own shortcomings. In particular, a user that receives information anonymously is usually left wondering who sent the information to the user.

Thus, there is much need for improvement in technology related to the sharing of information in numerous types of data platforms such as curated lists of content, social networking streams, music playlists, podcast episodes, video services, and/or other areas of online multimedia or content.

Figure 1:
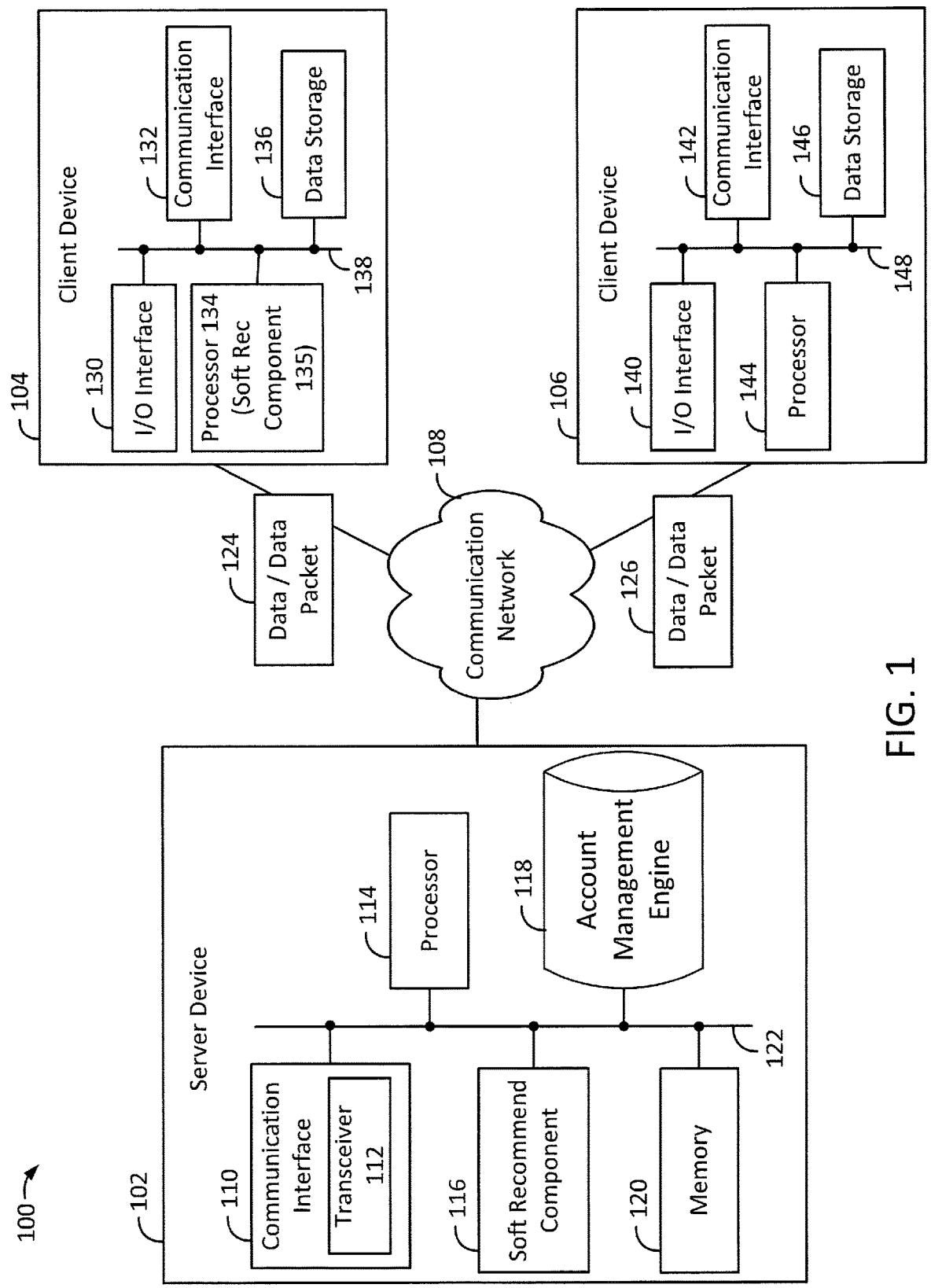
FIG. 1 is a block diagram of an example system, according to an embodiment.

Embodiments of the present disclosure and their advantages may be understood by referring to the detailed description that follows. It should be appreciated that like reference numerals are used to identify elements illustrated in one or more of the figures, where the figures illustrate various examples for purposes of examples and explanation related to the embodiments of the present disclosure and not for purposes of limitation.

DETAILED DESCRIPTION

Example embodiments herein describe the electronic sharing and processing of soft recommendations through user devices. Consider, for instance, the above issues with the first user sending to the second user the article describing the activities that successful people do during their lunch breaks. In addition to or alternatively to directly sending the article to the second user as described above, the first user may send the article to the second user as a soft recommendation. As such, the article may appear in the second user's account where various pieces of information are organized. For example, the article may be positioned within an assortment of articles curated to the second user's preferences. In some instances, the article may blend in with the assortment of articles such that the second user is less likely to wonder where the article came from or who, if anyone, may have sent the article.

In such manners, various types of information may be shared freely between users. For example, a soft recommendation may be a link to an article such as a hyperlink, a link to a network of articles, a reference located in a library, an offer, and/or an online source of data that the users can access. Further, the soft recommendation may provide or provide access to a document, an image, a presentation, an offer, and/or another medium that can be accessed via a user account. Thus, in another example, the first user may share dating information, socializing materials, and/or health information (e.g., weight loss, diets, and/or surgical recommendations) with the second user, without the first user and/or the second user feeling uncomfortable, embarrassed, and/or offended, such that the network of users may continue to share information and grow.

In some embodiments, the first user may be associated with one of many accounts in a hierarchy of user accounts for the second user. For example, considering the scenario above, the second user may select or interact with (e.g., "like") the article that appears in the second user's account as a soft recommendation. Based on the selection or interaction, the first user may be moved up one or more levels in the hierarchy. Further, the first user's position in the hierarchy may correspond with the second user's estimated interest in information provided by the first user. Further, the hierarch position or the estimated interest may determine how information is presented to the second user in future soft recommendations sent to the second user. For example, the system may determine a position or placement in the second user's account to provide the additional soft recommendations based on the first user's position in the hierarchy. If the second user "dislikes" or otherwise ignores the content, subsequent soft recommendations from the first user may be weighted less, e.g., with less prominence or possibly not even positioned or placed in the second user's account. On the other hand, if the second user "likes" or otherwise indicates a favorable response to the soft recommendation, subsequent soft recommendations from the first user may be weighted more, e.g., given higher or more favorable positions or placements in the second user's account.

FIG. 1 is a block diagram of an example system 100, according to an embodiment. As shown, the system 100 includes multiple computing devices, such as a server device 102, a client device 104, and a client device 106, among other possible computing devices. The server device 102 may be configured to support, operate, and/or manage numerous user accounts. The system 100 may operate with more or less computing devices than those shown in FIG. 1, where each device may be configured to communicate over a communication network 108. As shown, the server device 102, the client device 104, and the client device 106 are each configured to communicate over the communication network 108.

The server device 102 may be configured to perform various operations in accordance with this disclosure and the accompanying figures. For example, the server device 102 may be configured to access a request 124 generated by a first user account accessed by the first client device 104, where the request includes a soft recommendation intended for a second user account accessed by the second client device 106. The server device 102 may generate graphic data, which may include content associated with information, offers, education, incentives, invitations, notifications, opinion, and the like, based on the request and the soft recommendation. Further, the server device 102 may determine one or more locations or display configurations of the second user account to position the graphic data and/or one or more ways to present the graphic data to the second user, including fonts or images that are smaller/larger, dimmer/brighter, different colors, and the like. Yet further, the server device 102 may upload the graphic data to the second user account based on the one or more locations determined. The server device 102 may also transmit the uploaded graphic data 126 to the client device 106 enabled to access the second user account. The server device 102 may take the form of a stand-alone and/or an enterprise-class server device, another type of server device implementing one or more operating systems such as client- and/or server-based operating systems.

In some embodiments, the server device 102 may take a variety of forms and may include multiple components, including, for example, a communication interface 110, a transceiver 112, a processor 114, a soft recommend component 116, an account management engine 118, and a memory 120, any of which may be communicatively linked to the other components via a system bus, network, or other connection mechanism 122.

The communication interface 110 may take a variety of forms and may be configured to allow the server device 102 to communicate with one or more devices according to any number of protocols. For example, the communication interface 110 may include the transceiver 112 configured to allow the server device 102 to communicate with the client devices 104 and/or 106 via communication network 108. Further, the communication interface 112 and/or the transceiver 112 may take the form of a wired interface, such as an Ethernet interface. Yet further, the communication interface 110 and/or the transceiver 112 may take the form of a wireless interface, such as a cellular interface, a WI-FI interface, another short-range, point-to-multipoint voice and/or data transfer communication interface, such as BLUETOOTH. In some instances, the communication interface 110 and/or the transceiver 112 may send/receive data to/from client devices 104 and/or 106.

The processor 114 and/or the soft recommend component 116 may take the form of a multi-purpose processor (e.g., a microprocessor), a special purpose processor such as a digital signal processor (DSP), an application specific integrated circuit (ASIC), a programmable system on chip (PSOC), field-programmable gate array (FPGA), and/or another processing component configured to process data. For example, the processor 114 may process the request data generated by the first user account that includes the soft recommend data intended for the second user account. The soft recommend component 116 may generate graphic data based on the request data and the soft recommend data. Further, the soft recommend component 116 may determine one or more locations or display configurations (e.g., display formats) of the second user account to position and/or present the graphic data.

As noted, the data/data packet 124 may be accessed from the client device 104 and the data/data packet 126 may be sent to the client device 106, thereby exchanging data over the communication network 108. Further, the data/data packets 124 and 126 may include IP addresses of the client devices 104 and 106, respectively. For example, the processor 114 may access the data/data packets 124 associated with a first user account accessed by the client device 104. The soft recommend component 116 may be configured to generate graphic data and send the graphic data in the form of the data/data packet 124 based on the request data and the soft recommend data. Further, the soft recommend component 116 may be configured to determine locations of a second user account to position and/or one or more display formats to present the graphic data. The processor 114 may process the data/data packet 126 that is transmitted to a second user account on the client device 106. The data packets 124 and 128 may be accessible via protocols such as Transmission Control Protocol/Internet Protocol (TCP/IP). In various embodiments, each of the packets 126 and 128 may include 1,000 to 1,500 bytes, among other possible ranges.

The account management engine 118 may include numerous databases for storing, processing, and/or securing user account data in the server device 102. For example, the database engine 118 may include relational databases, possibly to perform account data processing and/or online analytical processing of user account data. The account management engine 118 may generate numerous search queries, search multiple databases in parallel, and produce search results simultaneously and/or consecutively. As such, the account management engine 118 may create multiple tables, database objects, indices, and/or views to perform user account management and/or analytical processing of numerous user accounts.

The memory 120 may include one or more of volatile, non-volatile, and/or removable storage components, such as magnetic, optical, or flash storage, and may be integrated in whole or in part with the processor 114 and/or the soft recommend component 116. Further, the memory 120 may include or take the form of a non-transitory computer-readable storage medium, having stored thereon machine-readable instructions (e.g., compiled or non-compiled program logic and/or machine code) that, when executed by the server device 102, cause the server device 102 to perform operations, such as those described in this disclosure and illustrated by the accompanying figures.

The client devices 104 and 106 may also be configured to perform a variety of operations such as those described in this disclosure and illustrated by the accompanying figures. For example, client devices 104 and 106 may be configured to exchange data/data packets 124 and/or 126 with the server device 102, that include request data, soft recommend data, graphic data, uploaded graphic data, account data, and/or other types of data described above. Client devices 104 and 106 may take a variety of forms, including, for example, a personal computer (PC), a smartphone, a wearable computer, a laptop/tablet computer, a merchant device, a smart watch with computer hardware resources, a head-mountable display, other types of wearable devices, and/or other types of computing devices capable of transmitting and/or receiving data, among other possibilities.

The client devices 104 and 106 may include various components, including, for example, input/output (I/O) interfaces 130 and 140, communication interfaces 132 and 142, processors 134 (including a soft recommend component 135) and 144, and data storages 136 and 146, respectively, all of which may be communicatively linked with each other via a system bus, network, or other connection mechanisms 138 and 148, respectively. It should be noted that the soft recommend component 135 may perform operations similar to that of the soft recommend component 116. For example, the soft recommend component 135 may generate graphic data locally on the client device 104 based on a request to provide a soft recommendation to a second user account.

The I/O interfaces 130 and 140 may be configured to receive inputs from (and provide outputs to) respective users of the client devices 104 and 106, possibly enabling the respective users to access their accounts via client devices 104 and 106, respectively. Thus, the I/O interfaces 130 and 140 may include input hardware such as a touchscreen, a touch sensitive panel, a microphone for receiving voice commands, a computer mouse, a keyboard, and/or other input hardware. In addition, I/O interfaces 130 and 140 may include output hardware such as displays possibly with touchscreen inputs, a sound speaker, other audio output mechanism, a haptic feedback system, and/or other output hardware.

In some embodiments, communication interfaces 132 and 142 may take a variety of forms and may be configured to allow client devices 104 and 106, respectively, to communicate with one or more devices according to any number of protocols. For instance, communication interfaces 132 and 142 may be configured to allow client devices 104 and 106, respectively, to communicate with the server device 102 via the communication network 108. The processors 134 and 144 may include general purpose processors and/or special purpose processors. Data storages 136 and 146 may include one or more volatile, non-volatile, removable, and/or non-removable storage components, and may be integrated in whole or in part with processors 134 and 144, respectively. Further, data storages 136 and 146 may take the form of non-transitory computer-readable storage mediums, having stored thereon machine-readable instructions that, when executed by processors 134 and 144, cause client devices 104 and 106 to perform operations, respectively, such as those described in this disclosure and illustrated by the accompanying figures.

In some embodiments, the communication network 108 may exchange data among the server device 102, the client device 104, the client device 106, and/or other client devices. The communication network 108 may be a packet-switched network configured to provide digital networking communications and/or exchange data of various forms, content, type, and/or structure. The communication network 108 may correspond to small scale communication networks, such as a private and/or local area network. The communication network 108 may also correspond to a larger scale network, such as a wide area network or the Internet, possibly accessible by the various devices 102, 104, and/or 106 of the system 100. The communication network 108 may include network adapters, switches, routers, network nodes, and/or various buffers and queues to exchange data/data packets 124 and/or 126. For example, the communication network 108 may be configured to carry the first data packet 126 and the second data packet 128 including request data, soft recommend data, graphic data, uploaded graphic data, account data, and/or other types of data described above. The communication network 108 may exchange such packets 124 and/or 126 between the server device 102, the client device 104, and/or the client device 106 using various protocols such as Transmission Control Protocol/Internet Protocol (TCP/IP), among other possibilities.

In some embodiments, the system 100 may include the communication interface 110 of the server device 102 that accesses request data 124 generated by a first user account accessible by the client device 104, where the request data 124 includes soft recommend data intended for a second user account. The soft recommend component 116 of the server device 102 may generate graphic data based on the request data 124 and/or the soft recommend data. The soft recommend component 116 may determine one or more locations or display configurations of the second user account to provide the graphic data, possibly based on an estimated interest that the second user may have in the graphic data. The account management engine 118 of the server device 102 may upload the graphic data to the second user account based on at least the one or more locations or display configurations of the second user account determined to provide the graphic data. The transceiver 112 of the communication interface 110 may transmit the uploaded graphic data 126 to the client device 106 enabled to access the second user account. The uploaded graphic data may be displayed on the client device anonymously without any indication of the first user account and the request data 124 generated by the first user account.

It can be appreciated that the server device 102 and the client devices 104 and 106 illustrated in FIG. 1 may be deployed in other ways. The operations performed and/or the services provided by such client devices 104 and 106 may be combined or separated for a given embodiment and may be performed by a greater number or fewer number of devices. Further, one or more devices may be operated and/or maintained by the same or different entities.

In some embodiments, a user account, possibly also referred to as an account, may be a compilation of data associated with a user and/or the user's interests. As such, some examples of accounts may include accounts for personalized magazines, accounts including information curated for each particular user, and/or accounts including information organized in a manner to be most fitting to a user's preferences. Further, some accounts may include aspects of social networking accounts, music playlist accounts, video streaming accounts, e-mail accounts, financial accounts, e-commerce accounts, smartphone accounts, and/or accounts with service providers, among other possibilities. For example, an account for a particular user may include data related to the user, data related to the user's interest, and/or data representing the user. Further, the user may provide various types of data to the account, such as data that the user might recommend to other users.

The user account may be displayed on a computing device, such as those described above in relation to FIG. 1. Thus, the user account may be displayed on a smartphone, a laptop computer, and/or a wearable computing device that may be used to access the account. The user may operate the computing device and their account may be managed on the computing device. For example, a computing device may be used to view and/or send request data, soft recommend data intended for a second user account, and/or graphic data generated based on the request data and/or the soft recommend data.

In some embodiments, a user may have a single account representing the user for multiple other accounts described above such as social networking accounts, e-mail accounts, and/or financial accounts, as well as websites, applications, and/or other services. For example, a user could opt to use their account as a multi-purpose account for performing various operations, including sending soft recommendations to one or more other user accounts. Further, the user may use the multi-purpose account to locate data, generate request data including soft recommend data intended for a second user account, and send graphic data to the second user account.

In some embodiments, a user account may be created by one or more users. Further, the account may be created by personal magazine services, applications, and/or websites, among other possibilities. As such, various users may have access to a particular account. For example, the user may be a corporation with access to a corporate account, possibly for its employees, staff, worker personnel, and/or contractors, among other individuals. Yet further, a user may be a computing device, a computing system, a robotic system, and/or another form of technology capable of sending and receiving data corresponding to the account. A user may provide a login, a password, a code, authentication data, biometric data, and/or other types of data to access the account.

Figure 2A:
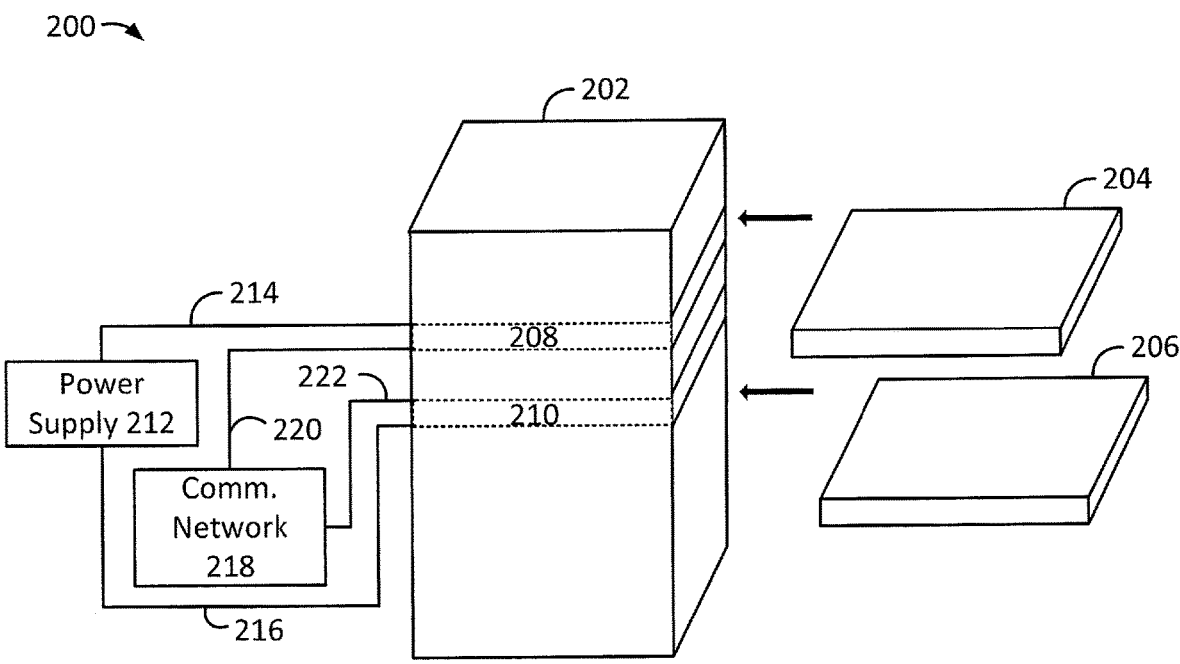
FIG. 2A illustrates an exemplary server device configured to support a set of trays, according to an embodiment.

FIG. 2A illustrates an exemplary server device 200 configured to support a set of trays, according to an embodiment. The server device 200 may, for example, take the form of the server device 102 described above in relation to FIG. 1. Further, the server device 200 may be configured to support, operate, run, and/or manage numerous user accounts and various types of data including request data, soft recommend data, graphic data, uploaded graphic data, account data, and/or other types of data described above.

As shown, server device 200 may include a chassis 202 that may support trays 204 and 206, and possibly multiple other trays as well. The chassis 202 may include slots 208 and 210 configured to hold trays 204 and 206, respectively. For example, the tray 204 may be inserted into the slot 208 and the tray 206 may be inserted into the slot 210. Yet, the slots 208 and 210 may be configured to hold the trays 204 and 206 interchangeably such that the slot 208 may be configured to hold the tray 206 and the slot 210 may be configured to hold the tray 204. For example, during operation of server device 200, the tray 204 may be inserted into the slot 208 and the tray 206 may be inserted into the slot 210. Further, the trays 204 and 206 may be removed from the slots 208 and 210, respectively. Yet further, the tray 204 may be inserted into the slot 210 and the tray 206 may be inserted into the slot 208, and the server device 200 may continue its normal operation without interruptions.

The chassis 202 may be connected to a power supply 212 via connections 214 and 216 to supply power to the slots 208 and 210, respectively. The chassis 202 may also be connected to the communication network 218 via connections 220 and 222 to provide network connectivity to the slots 208 and 210, respectively. As such, trays 204 and 206 may be inserted into slots 208 and 210, respectively, and power supply 212 may supply power to trays 204 and 206 via connections 214 and 216, respectively. Further, trays 204 and 206 may be inserted into slots 210 and 208, respectively, and power supply 212 may supply power to trays 204 and 206 via connections 216 and 214, respectively. Yet further, trays 204 and 206 may be inserted into slots 208 and 210, respectively, and communication network 218 may provide network connectivity to trays 204 and 206 via connections 220 and 222, respectively. In addition, trays 204 and 206 may be inserted into slots 210 and 208, respectively, and communication network 218 may provide network connectivity to trays 204 and 206 via connections 222 and 220, respectively.

The communication network 218 may, for example, take the form of communication network 108 described above in relation to FIG. 1. In some embodiments, the communication network 218 may provide a network port, a network hub, a network switch, or a network router that may be connected to an Ethernet link, an optical communication link, a telephone link, among other possibilities.

Figure 2B:
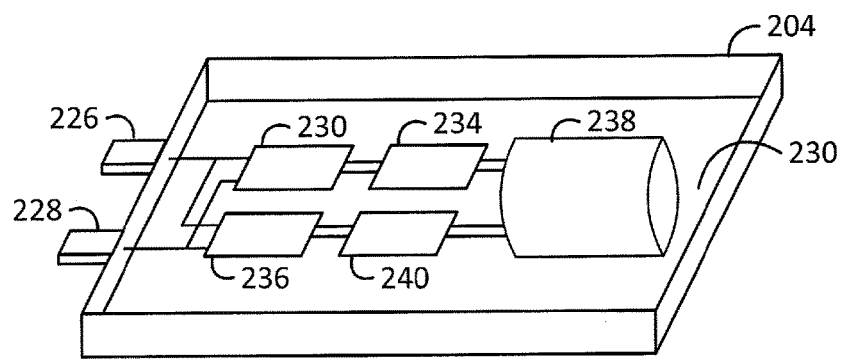
FIG. 2B illustrates an exemplary tray configured to support one or more components, according to an embodiment.

FIG. 2B illustrates an exemplary tray 204 configured to support one or more components, according to an embodiment. The tray 204 may, for example, take the form of tray 204 described in relation to FIG. 2A. Further, the tray 206 may also take the form of the tray 204. As shown, the tray 204 may include a tray base 230 as the bottom surface of the tray 204 configured to support multiple components such as a main computing board connecting one or more components 230-240. The tray 204 may include a connection 226 that may link to the connections 214 or 216 to supply power to the tray 204. The tray 204 may also include a connection 228 that may link to the connections 220 or 222 to provide network connectivity to the tray 204. The connections 226 and 228 may be positioned on the tray 204 such that upon inserting the tray 204 into the slot 208, the connections 226 and 228 couple directly with the connections 214 and 220, respectively. Further, upon inserting the tray 204 into the slot 210, the connections 226 and 228 may couple directly with connections 216 and 222, respectively.

The tray 204 may include components 230-240. In some instances, a communication interface 230, a processor 234, a soft recommend component 236, an account management engine 238, and a memory 240 may, for example, take the form of the communication interface 110, the processor 114, the soft recommend component 116, the account management engine 118, and the memory 120, respectively. As such, the connections 226 and 228 may be configured to provide power and network connectivity to each of the components 230-240. In some embodiments, one or more of the components 230-240 may be configured via one or more circuits that include resistors, inductors, capacitors, voltage sources, current sources, switches, logic gates, registers, and/or a variety of other circuit components to perform operations described herein and illustrated by the accompanying figures. In some embodiments, a system may execute instructions on a non-transitory, computer-readable medium to configure one or more of the components 230-240 to perform these operations.

Any two or more of the components 230-240 described above may be combined to take the form of one or more general purpose processors, microprocessors, and/or special purpose processors, among other types of processors. For example, two or more of the communication interface 230, the processor 234, the soft recommend component 236, the account management engine 238, and the memory 240 may be combined. Further, the combined device may take the form of one or more network processors, DSPs, PSOCs, FPGAs, and/or ASICs, among other types of processing devices and/or components. As such, the combined device may be configured to carry out various operations of the components 230-240.

In some embodiments, a system may include a communication interface 230 of a server device 202 that accesses request data generated by a first user account, where the request data includes soft recommend data intended for a second user account. The soft recommend component 236 of the server device 202 may generate graphic data based on at least one of the request data and the soft recommend data. The soft recommend component 236 may determine one or more locations or display configurations of the second user account to provide, position, and/or present the graphic data based on at least an estimated interest in the graphic data. An account management engine 238 of the server device 202 may upload the graphic data to the second user account based on at least the one or more locations or display configurations of the second user account determined to provide the graphic data. A transceiver of the communication interface 230 may transmit the uploaded graphic data to a client device enabled to access the second user account, where the uploaded graphic data is displayable on the client device anonymously without any indication of the first user account and the request data generated by the first user account.

Figure 3:
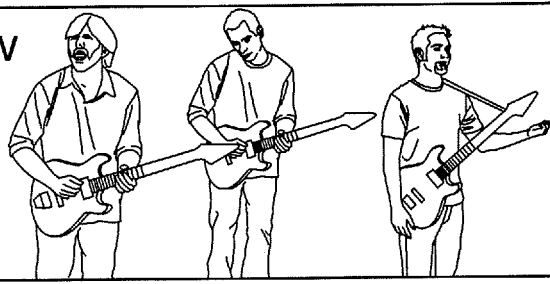
FIG. 3 illustrates a user account, according to an embodiment.
Figure 3:
Figure 3:
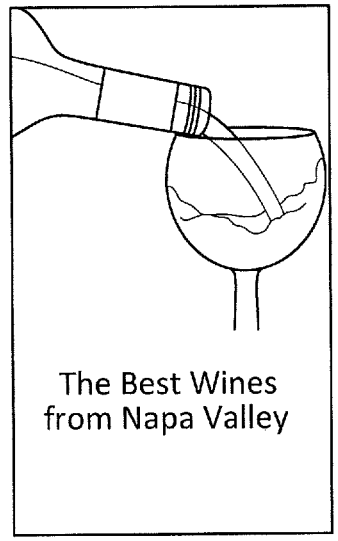
Figure 3:
Figure 3:
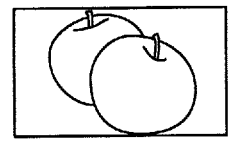
Figure 3:
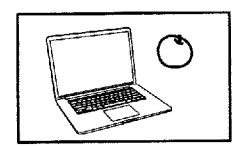

FIG. 3 illustrates a user account 300, according to an embodiment. Referring back to the scenarios above, consider the first user that wishes to send or recommend an article to the second user as a soft recommendation. As shown, the user account 300 may illustrate the second user's account with the soft recommendation sent from the first user. As described in the systems above, a communication interface of the server device may access request data generated by the first user account, where the request data includes soft recommend data, such as an article, that is intended for the second user account. The soft recommend component may generate graphic data 314 based on the request data and/or the soft recommend data associated with the article. As shown, the graphic data 314 may include an image of a laptop and a healthy snack from the article entitled, "What successful people do during their lunch breaks." Further, the soft recommend component may determine one or more locations 302-312 or display configurations of the second user account 300 to provide, e.g., position and/or present, the graphic data 314 based on an estimated interest in the graphic data.

In some embodiments, the soft recommend component may determine the estimated interest in the graphic data 314 based on one or more preferences indicated by the second user or the second user account. For example, the estimated interest may be based on one or more descriptions of preferences previously indicated by the second user account 300. In particular, the estimated interest may be based on prior "likes" and/or "dislikes" or other interactions by the second user account 300 to access certain types of data, possibly related to work, productivity, and/or efficiency. In some instances, the soft recommend component may determine the estimated interest in the graphic data 314 based on a level of the first user in a hierarchy of user accounts for the second user account. For example, the higher the level of the first user in the hierarchy, the soft recommend component may determine a stronger estimated interest in the graphic data 314.

In some instances, the soft recommend component may include a description with the graphic data 314 based on the estimated interest in the graphic data 314. For example, the soft component may include the word "productivity" or "efficiency" with the graphic data 314. In some instances, the graphic data 314 may be formatted based on relevance to other preferences of the user account 300. Further, the display configurations of the graphic data 314 may formatted based on an estimated interest in the article, among other possibilities.

In some embodiments, the soft recommend component may determine a particular location 312 of the one or more locations 302-312 to provide the graphic data based on one or more commonalities, possibly between the graphic data 314 and other data in the one or more locations 302-312 of the user account 300. In particular, the location 310 may include information related to "healthy foods" and the graphic data 314 may include information for "lunch breaks," where both types of information possibly relate to the commonality of heath, food, and/or eating. Yet further, the location 304 may include information related to "smart watches" and the graphic data 314 may include information related to "productivity" or "computers," where the both types of information may possibly relate to the commonality of technology. In addition, the commonality may be based on user preferences, possibly stored with the user account 300. As such, the commonality may be based on various types of information that the second user may be interested in such as health, food, eating, technology, productivity, among other types information.

In some embodiments, as shown, the soft recommend component may determine the location 302 to provide the graphic data 314, possibly sharing the location 302 with an article on the "Top 10 Best New Musical Acts of the Year." Further, the soft recommend component may determine the location 304 to provide the graphic data 314, possibly sharing the location 304 with an informational review, "Smart Watches, the New Craze." Yet further, the soft recommend component may determine the location 306 to provide the graphic data 314, possibly sharing the location 306 with an educational opinion, "The Best Wines from Napa Valley." Yet further, the soft recommend component may determine the locations 308, 310, and/or 312 to provide the graphic data 314, where the locations 308, 310, and/or 312 may be related to a presidential election, healthy foods, and productivity, respectively. Thus, the soft recommend component may take one or more portions of the article to generate the graphic data 314 such that the data 314 fits into any one of the locations 302-312.

The account management engine may upload the graphic data 314 to the second user account 300 based on the one or more locations 302-312 or display configurations configured to provide the graphic data 314. As shown, for example, the account management engine may upload the graphic data 314 to the location 312 of the second user account 300. The transceiver may transmit the uploaded graphic data 314 to the second user's client device enabled to access the second user account 300. Further, the uploaded graphic data 314 may be displayed on the second user's client device anonymously without any indication of the first user account and the request data generated by the first user account. Further, as shown, the one or more locations 302-312 of the second user account 300 may include at least one location of curated data, possibly including a compilation of data associated with the second user and/or the second user's interests. The uploaded graphic data 314 may be displayable in the second user account 300 such that the first user may freely share the data 314 with the second user, among various other types of data. With data generally being shared freely amongst the users, the network of users may continue to grow.

In some embodiments, the soft recommend data may indicate a level of softness corresponding to a particular location 312 of the one or more locations 302-312 of the second user account 300 determined to provide the graphic data 314. In some instances, the level of softness indicated may correspond to a display configuration, a size, shape, and/or color of the graphic data 314 and/or the text in the graphic data 314. As noted, the graphic data 314 may be generated with one or more possibly display configurations to fit the particular size of the location 312. As such, the first user may further specify where and/or how the graphic data 314 may appear in the second user's account 300. Yet, in some instances, the first user may indicate a level of softness and the system may determine which one or more of the locations 302-312 where the graphic data 314 may appear and/or how the data 314 may appear, possibly based on how the second user historically interacts with the user interface 300.

In some embodiments, the particular location 312 of the one or more locations 302-312 of the second user account 300 determined to provide the graphic data 314 may be proximate to one or more locations 308-312 that include curated data. For example, locations 308-312 may be designated as locations including curated data in the second user account 300. As such, the particular location 312 may be determined to provide the graphic data 314, possibly such that the graphic data 314 appears part of the curated data provided in accordance with the second user's preferences.

It should be noted that the user account 300 may take the form of various other types of accounts. As such, a soft recommendation may be sent to the user account 300, where the user account 300 may take the form of an email account, a social media account, a music playlist account, a podcast account, a video services account, and/or other types of accounts with access to online multimedia. As such, the soft recommendation may be provided in a curated list, a digital advertisement, a social networking stream, a music playlist, a podcast playlist, a video list, and/or other sources or platforms of online multimedia. For example, the first user may be embarrassed to recommend a song/video to the second user, where the song/video is a teen pop song/video or a "boy band" song/video. In such instances, the first user may send the song/video to the second user as a soft recommendation. Further, the server device may determine the appropriate account, such as a music playlist account, to provide the soft recommendation to the second user.

Figure 4:
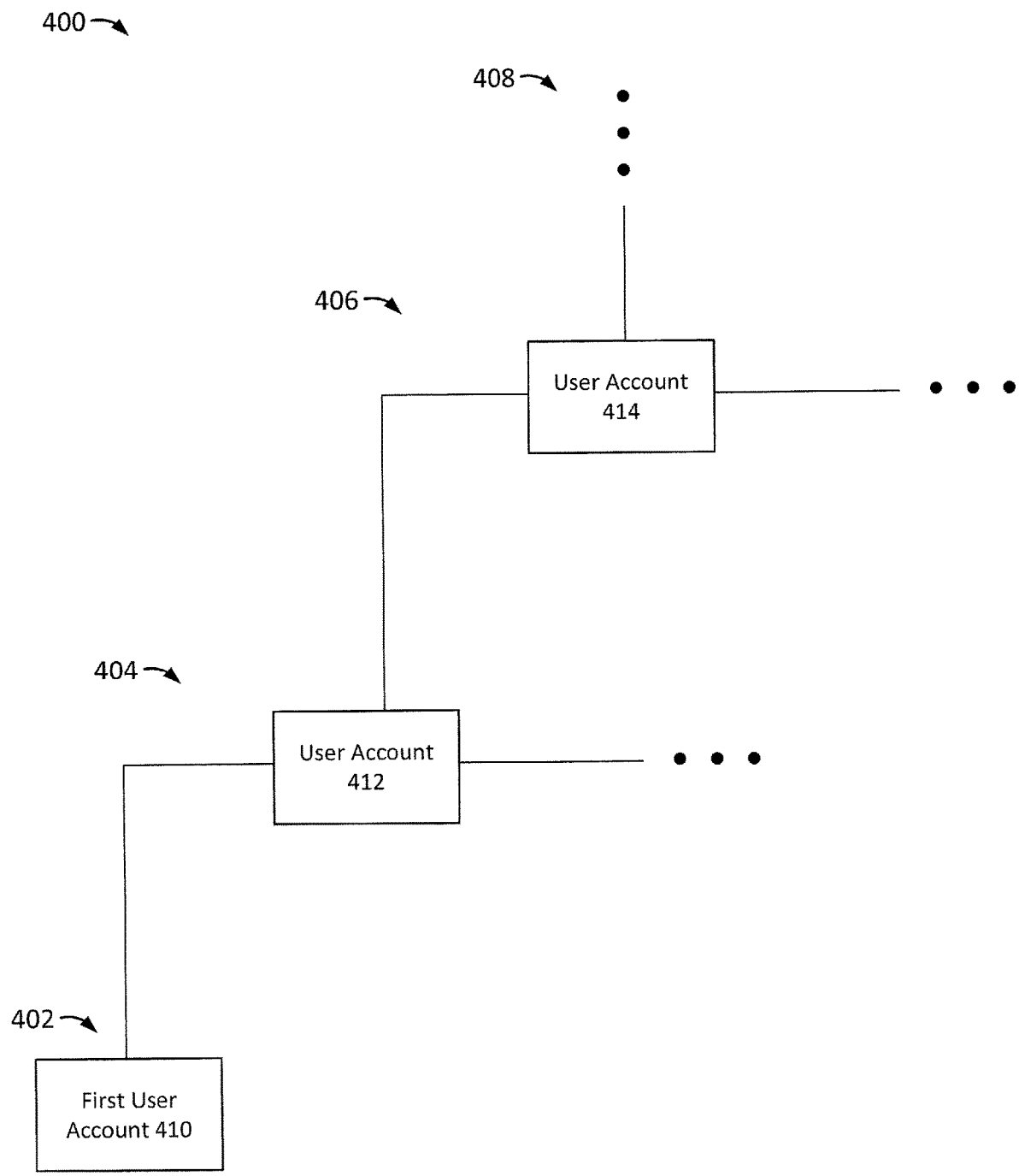
FIG. 4 illustrates a hierarchy of user accounts, according to an embodiment.

FIG. 4 illustrates a hierarchy 400 of user accounts, according to an embodiment. As shown, the hierarchy 400 includes multiple levels 402-408, where each level may include one or more user accounts associated with the second user account described above. For example, the level 402 may include the first user account 410, the level 404 may include another user account 412, the level 406 may include yet another user account 414, and the one or more levels 408 may include additional user accounts as illustrated by the vertical ellipses. Further, each level of the hierarchy 400 may extend horizontally as shown by the horizontal ellipses in levels 404 and 406.

In some embodiments, the soft recommend component may determine the estimated interest in graphic data described above, possibly based on the level 402 of the first user account 410 in the hierarchy 400 for the second user account. Referring back to the scenario where the first user account sends a soft recommendation to the second user account, the first user account 400 may be one account in the hierarchy 400 of user accounts for the second user account. Based on whether the uploaded graphic data 314 shown in FIG. 3 is selected or interacted with via the second user account 300, the first user account 410 may be moved by one or more levels in the hierarchy 400. As such, the soft recommend component may determine further estimated interests based on the modified level of the first user account. For example, the soft recommend component may determine further estimated interests the second user may have in the graphic data based on the modified level 404-408 of the first user account compared to other user accounts 412 and 414.

In some instances, the level 402 of the first user account 410 may be modified by increasing or moving up in the hierarchy 400 of user accounts. Further, based on whether the uploaded graphic data 314 is not selected or interacted (e.g., after a threshold period of time) with via the second user account 300, the first user account 410 may stay in the level 402 or moved downward in the hierarchy 400. Thus, the modified level of the first user account 410 may correspond to further estimated interests of the second user account in additional soft recommendations sent by the first user account.

In some embodiments, the level of the first user account 410 may also be modified based on the interaction between the first user account 400 and the second user account. For example, based on data exchanged such as messages, chats, and/or other interactions such as "likes" between the first user account 400 and the second user account, the first user account 400 may be moved up in the hierarchy 400 of user accounts. In some instances, based on the increased level of interaction between the accounts, the first user account 400 may be more likely to recommend information that the second user may be interested in.

Figure 5:
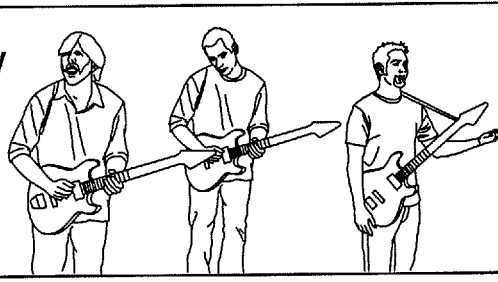
FIG. 5 illustrates a user account based on a hierarchy of user accounts, according to an embodiment.
Figure 5:
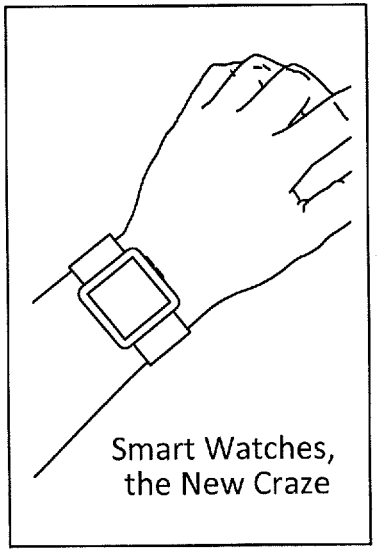
Figure 5:
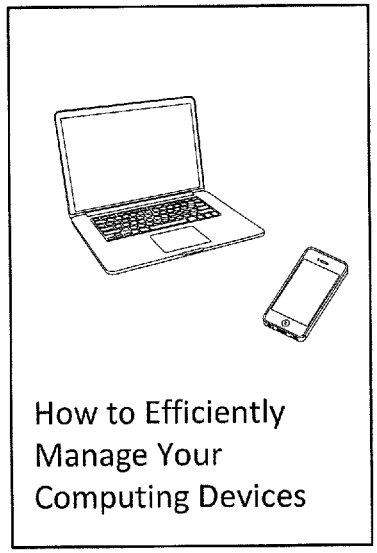
Figure 5:
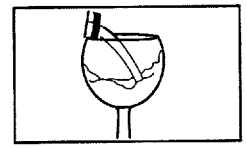
Figure 5:
Figure 5:
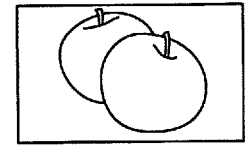

FIG. 5 illustrates a user account 500 based on a hierarchy of user accounts, according to an embodiment. As shown, the user account 500 may be similar to that of the second user account 300 described above in FIG. 3 including the soft recommendation with the graphic data 314. Further, the user account 500 may be based on the hierarchy 400 described above in relation to FIG. 4. Considering one or more scenarios above where the first user wishes to send an article to the second user, further contemplate that the level of the first user account 410 may be increased or moved up in the hierarchy 400. Thus, as shown in FIG. 5, the second user's account 500 may provide information based on this increased level of the first user account 410 in the hierarchy 400.

In some embodiments, the communication interface of the server device described above may access second request data generated by the first user account, where the second request data may include second soft recommend data, e.g., a second article, intended for the second user account 500. As such, the soft recommend component described above may generate second graphic data 514 based on the first request data and/or the first soft recommend data described above in relation to FIG. 3. Further, the soft recommend component may generate the second graphic data 514 based on the second request data and the second soft recommend data of the second article. As shown, the graphic data 514 may illustrate computing devices such as a laptop and a smartphone with the text, "flow to Efficiently Manage Your Computing Devices," possibly from the second article. In addition, the soft recommend component may determine one or more second locations 502-512 of the second user account 500 to provide the second graphic data 514 based on the modified level of the first user account 410 in the hierarchy 400 of the user accounts. As shown, for example, the soft recommend component may determine the second location 506 to provide the second graphic data 514.

For example, referring back to FIG. 3, the second user may interact with the graphic data 314, possibly viewing the article sent to the second user as a soft recommendation. As such, the first user account's level may be moved or dynamically changed from the level 402 to the level 404 in the hierarchy 400. Thus, based on the first user account's level 404, the soft recommend component may determine the location 506 of the one or more second locations 502-512 to provide the second graphic data 514 for viewing the second article of the second soft recommendation. It should be noted that the soft recommend component may determine the location 506 based on categorizing the article represented by the graphic data 514. For example, the article represented by the graphic data 514 includes the text, "Efficiently" and "Computing Devices." Further, the article represented by the graphic data 314 may include the text, "Successful." In some instances, the soft recommend component may determine the graphic data 514 is in the same or similar category (e.g., profession, career, work, and/or occupation) as the graphic data 314, the graphic data 514 may be provided in the location 506, or possibly locations 502 or 504. Yet, consider a scenario where the graphic data 514 includes content regarding cars, possibly a category that the second user may not be interested in. In that scenario, the graphic data 514 may be moved to one of the other locations 508-512.

In some embodiments, the soft recommend component may determine the format of the graphic data 514 based on one or more categories described above. For example, as noted, the soft recommend component may determine the graphic data 514 is in the same or similar category as the graphic data 314. As such, the soft recommend may generate the graphic data 514 based on display configurations such as format, links, images, text, and/or other similarities with the graphic data 314.

In some embodiments, the account management engine of the server device described above uploads the graphic data 514 to the second user account 500 based on the one or more second locations 502-512 or display configurations of the second user account 500 determined to provide the second graphic data 514. The transceiver of the communication interface described above transmits the uploaded second graphic data 514 to the second user's client device.

Figure 6:
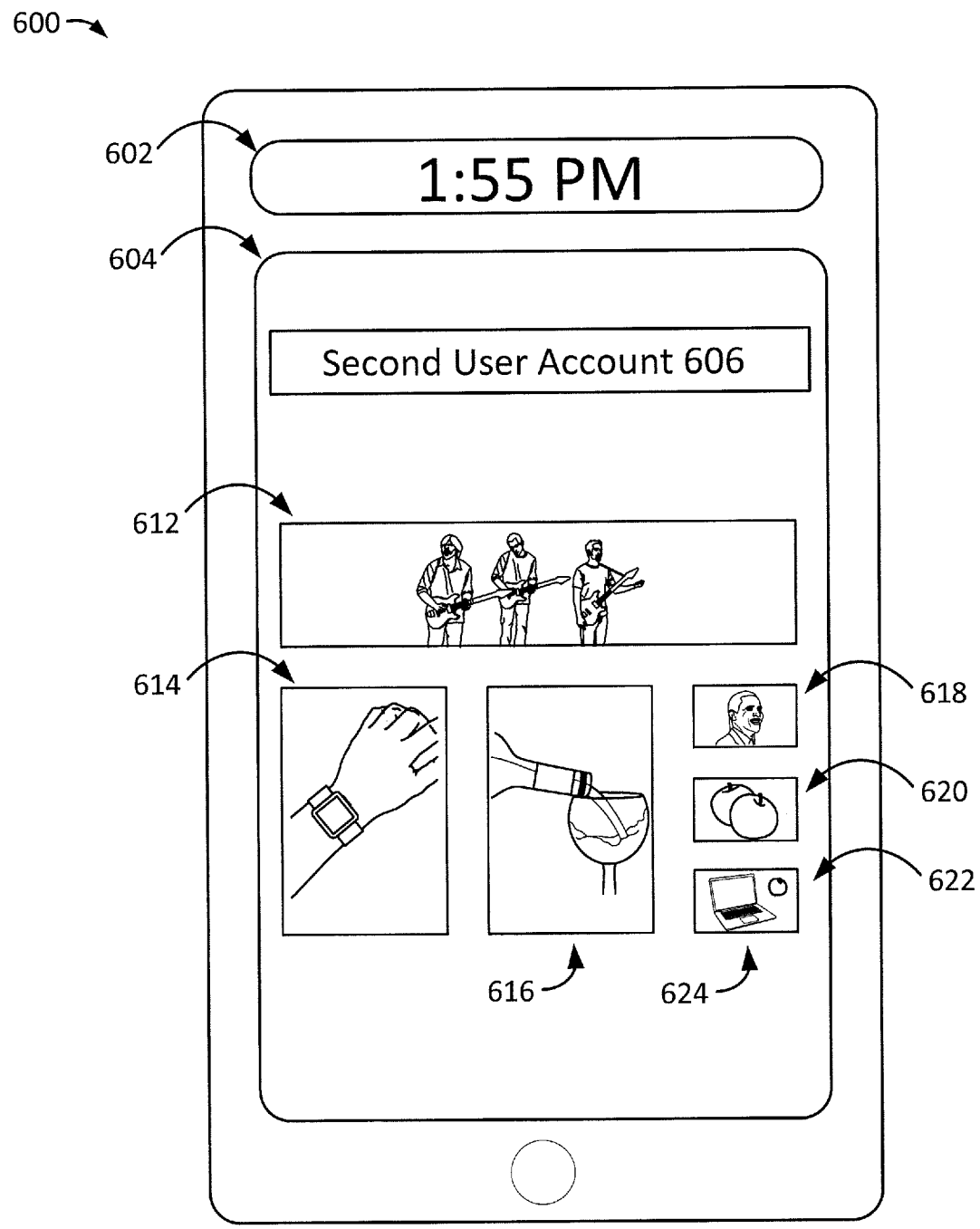
FIG. 6 illustrates uploaded graphic data, according to an embodiment.

FIG. 6 illustrates uploaded graphic data 624, according to an embodiment. For example, consider the scenarios described above in relation to FIG. 3 where the first user sends the article to the second user as a soft recommendation. As shown, the client device 600 may be the second user's client device with access to the second user's account 606. As such, the client device 600 may display the time 602 and the input/output (I/O) interface 604 that provides the second user account 606. The second user account 606 may provide the uploaded graphic data 624 in one or more of the locations 612-622. It should be noted, that location 612-622 may correspond to locations 302-312 described above in relation to FIG. 3.

As noted, the account management engine of the server device described above uploads the graphic data 624 to the second user account 600 based on the one or more locations 612-622 or display configurations of the second user account 600 determined to provide the graphic data 624. The transceiver of the communication interface described above transmits the uploaded graphic data 624 to the second user's client device.

Figure 7:
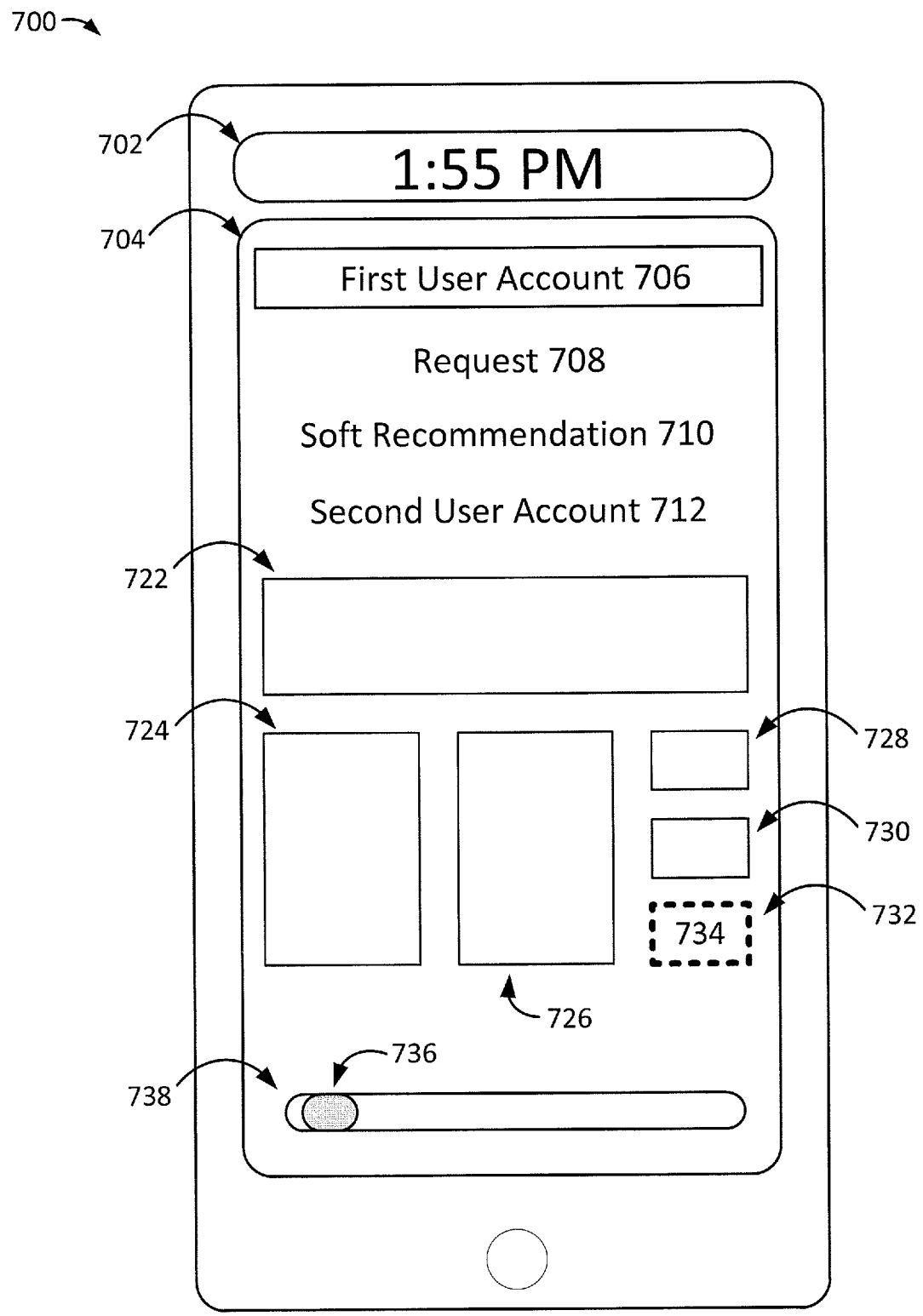
FIG. 7 illustrates a request to provide a soft recommendation, according to an embodiment.

FIG. 7 illustrates a request to provide a soft recommendation 710, according to an embodiment. For example, consider the scenarios described above in relation to FIG. 3 where the first user creates a request to send the article to the second user as a soft recommendation. As shown, the client device 700 illustrates such a request. Thus, the first user may specify how the soft recommendation 710 is sent to the second user account. As shown, the client device 700 may display the time 702 and the input/output (I/O) interface 704 that provides the first user account 706.

In some embodiments, a non-transitory computer-readable medium may have stored thereon machine-readable instructions that, when executed by the first client device 700, cause the first client device 700 to perform operations. These operations may include receiving, by the input/output (I/O) interface 704 of the first client device 700, an input from the first user (or first user account 706) that indicates a request 708 to provide a soft recommendation 710 to a second user account 712. As noted, the soft recommendation 710 may be a link, a hyperlink, a reference, and/or an online source of data that the second user can access. Further, the soft recommendation 710 may be a document, an image, a presentation, and/or another form of medium that can be uploaded and shown in the second user account 712.

In some embodiments, the operations described above may include generating, by a soft recommend component of the first client device 702, graphic data 734 based on the request 708 to provide the soft recommendation 710 to the second user account 712. The soft recommend component of the first client device 702 may, for example, take the form of the soft recommend component 135 of the first client device 104 described above in relation to FIG. 1. As such, the operations may also include determining, by the soft recommend component, one or more locations 722-732 or display configurations of the second user account 712 to provide the graphic data 734. As shown, the one or more locations 722-732 of the second user account 712 may include curated data and borders separating each of the one or more locations 722-732, possibly such that the first user may adjust the border using the I/O interface 704 in the request 708 to send the soft recommendation 710.

In some embodiments, determining the one or more locations 722-732 or display configurations of the second user account 712 to provide the graphic data 734 comprises determining one or more display configurations based on the graphic data 734 generated. For example, determining the one or more display configurations to provide the graphic data 734 may be based on aspects of the graphic data 734. For example, the graphic data 734 may be displayed with or without text, graphics, images, illustrations, hyperlinks, and/or borders, among other possibilities.

Further, the operations may include transmitting, by a communication interface of the first client device 700, the graphic data 734 and the one or more locations 722-732 or display configurations of the second user account 712 to at least one of a server device as described above and a second client device enabled to access the second user account 712. Notably, the graphic data 734 is displayable on the second client device anonymously without any indication of the input from the first account 706 that indicates the request 708 to provide the soft recommendation 710 to the second user account 712.

In some embodiments, the request 708 may indicate a level of softness 736 on a softness scale 738 corresponding to the particular location 732 of the one or more locations 722-732 of the second user account 712 determined to provide the graphic data 734. As shown, by moving the level of softness 736 from left to right on the softness scale 738, for example, the particular location 732 may be selected from the one or more location 722-732. In some instances, by moving the level of softness 736 further to the right on the softness scale 738, the particular location 726 may be selected from the one or more location 722-732, among other possibilities. It should be noted that the location selected from the one or more locations 722-732 may be based on locations previously selected by the second user, and/or data exchanged such as messages, chats, and/or other interactions such as "likes," "dislikes," ignoring content based on response time, and/or sharing content between the first user account 706 and the second user account.

In some embodiments, the estimated interest in graphic data 734 may be based on a level of the first user account 706 in a hierarchy of user accounts for the second user account 712, as described above in relation to FIG. 4. Further, based on whether the graphic data 734 is selected via the second user account 712, a level of the first user account 706 may be modified in the hierarchy of user accounts for the second user account 712.

In some embodiments, the instructions executed by the computing device 700 may cause the computing device 700 to perform additional operations. The operations may include receiving, by the I/O interface 704, a second input from the first user account 706 that indicates a second request to provide a second soft recommendation to the second user account 712. The operations may include generating, by the soft recommend component, second graphic data based on the request 708, the soft recommendation 710, the second request, and/or the second soft recommendation. Further, the operations may include determining, by the soft recommend component, one or more second locations 722-732 of the second user account 712 determined to provide the second graphic data based on the modified position of the first user account 706 in the hierarchy of the user accounts. The operations may also include transmitting, by the communication interface, the second graphic data and the one or more second locations 722-732 of the second user account 712 to one or more server devices and/or the second client device.

Figure 8:
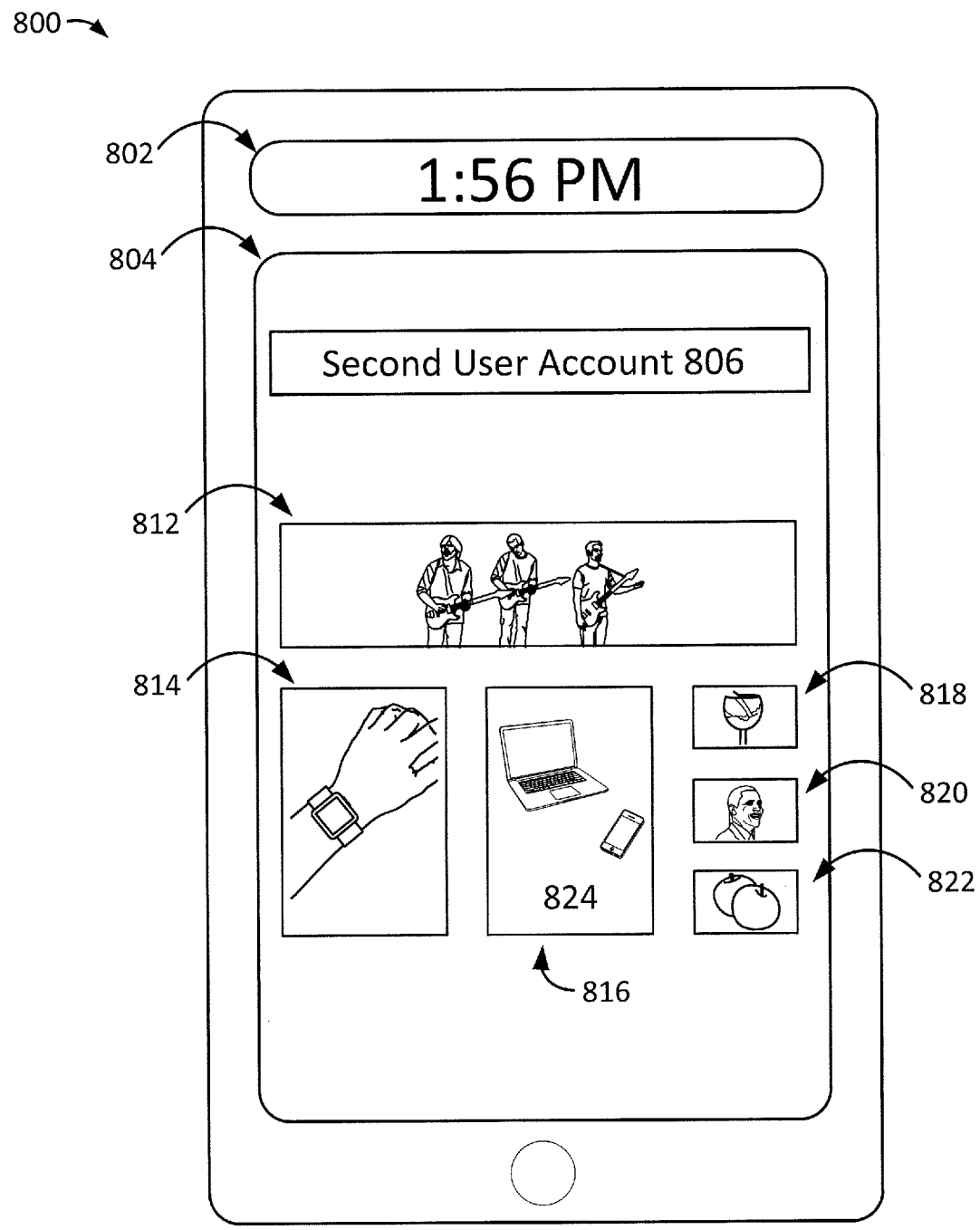
FIG. 8 illustrates uploaded graphic data, according to an embodiment.

FIG. 8 illustrates uploaded graphic data 824, according to an embodiment. For example, consider the scenarios above where the first user sends a second soft recommendation to the second user, possibly based on the hierarchy of user accounts. As shown, the client device 800 may be the second user's client device with access to the second user's account 806. Further, the client device 800 may display the time 802 and the input/output (I/O) interface 804 that provides the second user account 806. Yet further, the second user account 806 may provide the uploaded graphic data 824 in one or more of the locations 812-822. It should be noted, that the locations 812-822 may correspond to locations 612-622 described above in relation to FIG. 6, possibly after receiver the second soft recommendation.

As shown, the one or more locations 812-822 of the second user account 806 may include at least one location of curated data. For example, the locations 812, 814, and/or 816 may include one or more locations of curated data. In some embodiments, the particular location 816 of the one or more locations 812-822 of the second user account 806 determined to provide the graphic data 824 may be proximate to one or more locations 812, 814, and 818-820 including the curated data. In some embodiments, the graphic data 824 may be displayable on the second client device 800 anonymously without any indication of the input from the first account and/or the request to provide the soft recommendation to the second user account.

Figure 9:
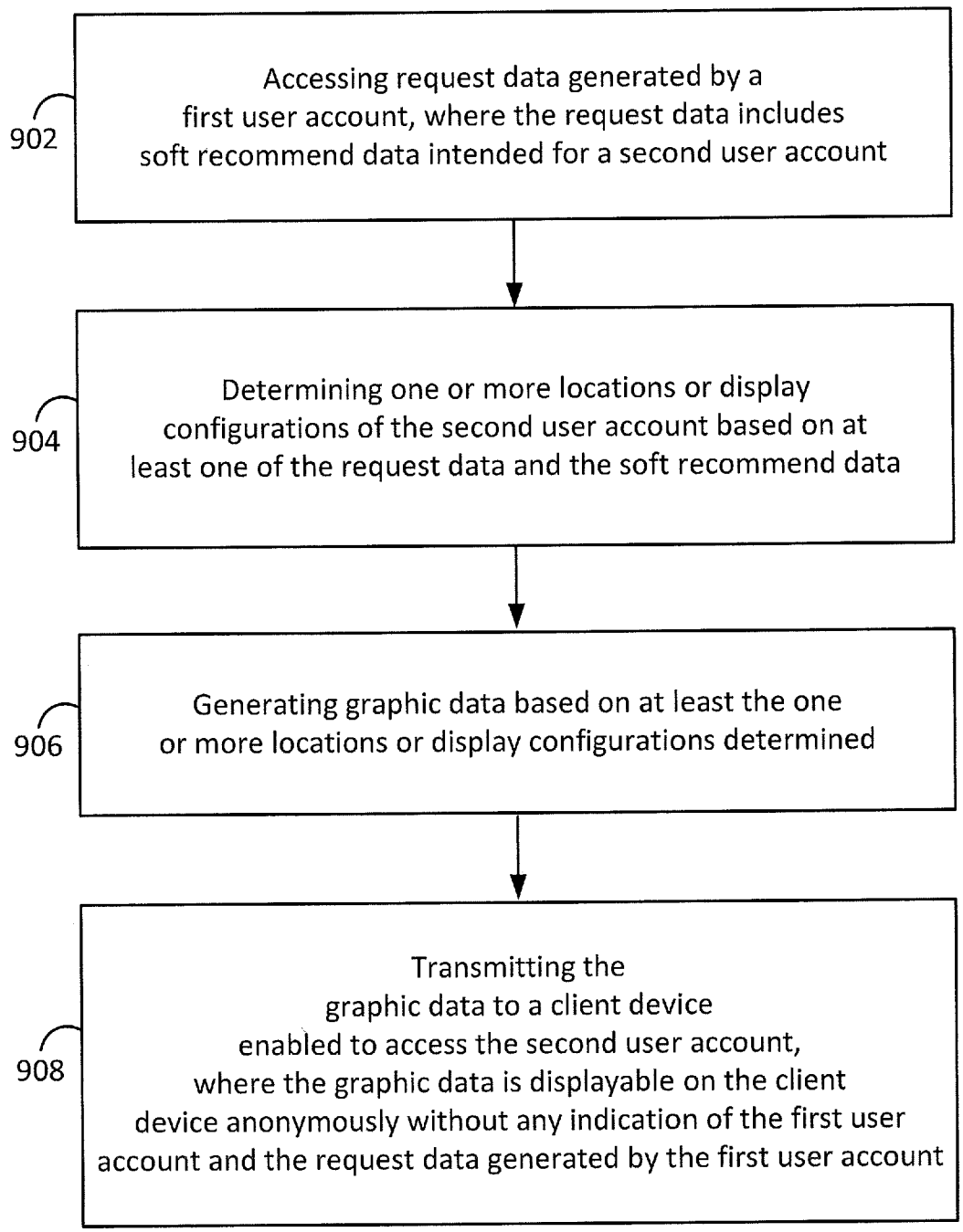
FIG. 9 is a flowchart of an exemplary method, according to an embodiment.

FIG. 9 is a flowchart of an exemplary method 900, according to an embodiment. Notably, one or more steps of the method 900 or other methods/processes described herein may be omitted, performed in a different sequence, and/or combined for various types of applications.

At step 902, the method 900 may include accessing request data generated by a first user account, where the request data includes soft recommend data intended for a second user account. For example, considering one or more scenarios above, the server device may access request data generated by the first user account, where the first user may wish to share an article or an image with the second user.

At step 904, the method 900 may include determining one or more locations or display configurations of the second user account based on at least one of the request data and the soft recommend data. For example, the soft recommend component and/or the account management engine of the server device described above may determine one or more locations or display configurations of the second user account based on at least an estimated interest in the graphic data. Further, the one or more locations may be determined based on the soft recommend data. For example, in some instances, the soft recommend data may include image data and the one or more locations may be determined based on how the image data may be provided in the second user account. In particular, the one or more locations may be determined based on how the image data may fitted, sized, and/or shared with other information in the one or more locations. In some instances, determining the one or more locations of the second user account may include determining a display configuration to present the graphic data. For example, the display configuration may indicate a display with or without text, graphics, images, illustrations, and/or icons.

At step 906, the method 900 may include generating graphic data based on at least the one or more locations or display configurations determined. Considering the example above, generating the graphic data may be based on the image data. For instance, the graphic data may be generated to include portions of the image data based on the one or more locations determined. In particular, the portions of the image data may be selected to fit in the one or more locations determined. In some instances, generating the graphic data based on the one or more locations or display configurations determined may include generating the graphic data based on the one or more locations determined and one or more of preferences indicated by the second user account as described above.

At step 908, the method 900 may include transmitting the graphic data to a client device enabled to access the second user account, where the graphic data is displayable on the client device anonymously without any indication of the request data generated by the first user account. Further considering the examples above, transmitting the graphic data to the client device may include transmitting the selected portions of the image data to the client device.

In some embodiments, the estimated interest in the graphic data may be based on a level of the first user account in a hierarchy of user accounts for the second user account, as described above in relation to FIGS. 1-8. Further, based on whether the graphic data is selected or interacted with via the second user account, a level of the first user account may be modified in the hierarchy of user accounts. For example, considering the scenarios above, the second user may view or interact with the portions of the image data provided in the second user account. As such, the level of the first user account may be modified in the hierarchy of user accounts, possibly moving up one or more levels.

In some embodiments, the method 900 may include accessing second request data generated by the first user account, where the second request data includes second soft recommend data intended for the second user account. Further, the method 900 may include determining one or more second locations of the second user account based on at least the modified level of the first account in the hierarchy of user accounts. Yet further, the method 900 may include generating second graphic data based on at least the one or more second locations determined. In addition the method 900 may include uploading the second graphic data to the second user account based on the one or more second locations determined.

Figure 10A:
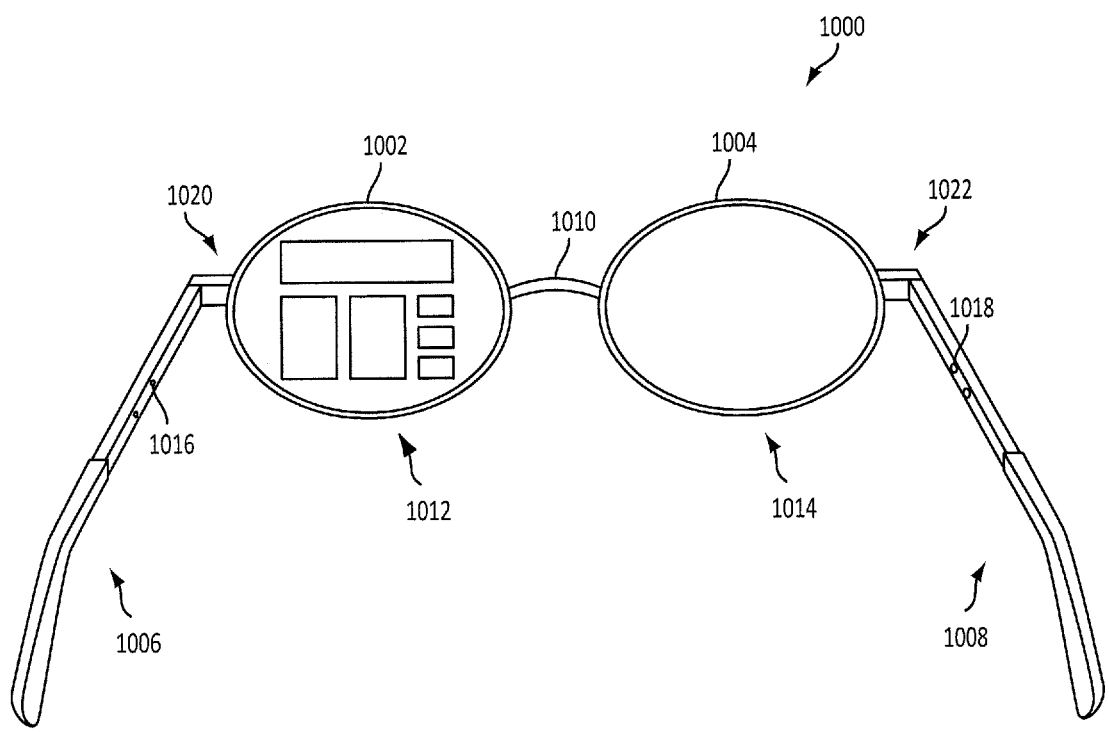
FIGS. 10A and 10B illustrate an exemplary wearable computing device, according to an embodiment.
Figure 10B:
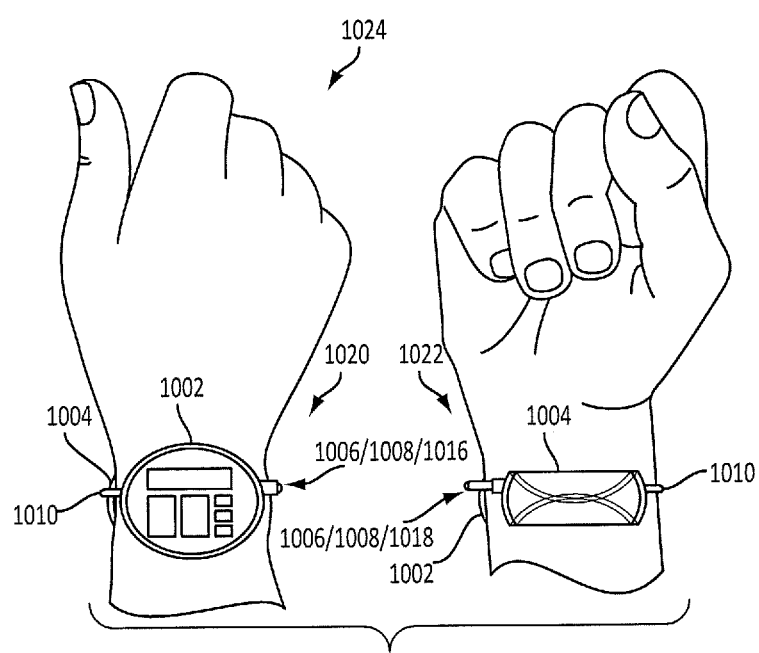

FIGS. 10A and 10B illustrate an exemplary wearable computing device 1000, according to an embodiment. For example, the method 900 described above may include transmitting the second graphic data to the client device 1000 and causing the client device 1000 to display the second graphic data, as shown in FIGS. 10A and 10B.

As illustrated, the wearable computing device 1000 may include a head-mountable display and an arm or wrist-mountable display. As shown in FIG. 10A, the wearable computing device 1000 may be wearable as a head-mountable device (HMD). The client device 1000 may include lenses 1002 and 1004. The client device 1000 may also include a side component 1006, a side component 1008, and a middle component 1010. For example, the computing device 1000 may be mountable on a user's head such that the side component 1006 rests on one ear of the user and the side component 1008 rests on the other ear of the user. Further, the middle component 1010 may rest on the nose of the user. In some instances, the lenses 1002 and 1004 may be positioned in front of the user's eyes. Further, the lenses 1002 and 1004 may include displays 1012 and 1014, respectively. In some instances, the displays 1012 and 1014 may be transparent, partially see-through, and/or configured to provide an augmented reality. Further, the displays 1012 and/or 1014 may include touch pad displays to display data and receive touch inputs such that the user can manipulate graphics provided by the displays 1012 and/or 1014. The lenses 1002 and/or 1004 may also include scanners such as laser scanners configured to scan the eyes of the user to retrieve biometric data from the user's eyes, retinas, and/or irises, possibly for authenticating the user's account.

As shown in FIG. 10B, the wearable computing device 1000 may also be wearable as an arm/wrist-mountable device. Yet, the wearable computing device 1000 may take the form of a bracelet, an anklet, and/or a necklace, among other forms of jewelry. As shown, the side components 1006 and 1008, the middle component 1010, and/or the lenses 1002 and 1004 may be adjustable to fit on an arm and/or wrist 1024 of a user. As shown, the lens 1002 may be positioned on the top of the wrist 1024 to operate as the face of a wrist watch. The side components 1006, 1008, and/or the middle component 1010 may be adjusted to fit around the wrist 1024. The lens 1004 may be positioned on the bottom of the wrist 1024. As shown, the lens 1004 may be flexible, foldable, and/or retractable, among other ways to adjust into the form of a wrist-watch band.

The wearable computing device 1000 may include one or more sensors 1016 and/or 1018 configured to receive a number of inputs associated with the user. The one or more sensors 1016 and/or 1018 may include accelerometers, gyroscopes, compasses, barometers, capacitive sensors, haptic sensors, temperature sensors, ambient light sensors, sound sensors, image sensors, biometric sensors, moisture sensors, electrodes, and/or chemical sampling sensors, among other types of sensors to receive inputs from the user. For example, based on the way the wearable computing device 1000 is worn as a head-mountable device or an arm/wrist-mountable device, the sensors 1016 and/or 1018 may be configured to receive inputs directly and/or indirectly from the user.

The present disclosure, the accompanying figures, and the claims are not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A system, comprising:
a non-transitory memory; and
one or more hardware processors coupled to the non-transitory memory and configured to read instructions from the non-transitory memory to cause the system to perform operations comprising:
   accessing recommendation data generated by a first user account and intended for a second user account, the recommendation data including image data and an identifier specifying the second user account to which the recommendation data is exclusively directed;
   retrieving a display configuration of the second user account;
   causing the display configuration of the second user account to display in a user interface of the first user account adjacent to a continuous sliding scale to allow a user of the first user account to view a location where the recommendation data will be displayed relative to locations of other displayed data in the second user account;
   receiving a scale position of the continuous sliding scale in the user interface of the first user account, wherein the scale position of the continuous sliding scale is associated with the location that the user of the first user account intends the recommendation data to be displayed in the second user account relative to the locations of the other displayed data in the second user account;
   assigning a hierarchal position to the recommendation data in correlation with the scale position of the continuous sliding scale;
   selecting a location among one or more locations within a display of the second user account based on the hierarchal position assigned to the recommendation data, the location having a predetermined size;

selecting a portion of the image data that fits within the predetermined size of the location;

generating graphic data based on the selected portion of the image data; and causing the graphic data to be displayed at the location within the display of the second user account.

2. The system of claim 1, wherein the locations of the other displayed data comprises curated data.

3. The system of claim 1, wherein the operations further comprise determining an estimated interest in the graphic data based on one or more preferences associated with the second user account.

4. The system of claim 1, wherein the operations further comprise:

determining an estimated interest in the graphic data;

receiving a selection of the graphic data from the second user account; and increasing the estimated interest of the graphic data based on the selection of the graphic data.

5. The system of claim 4, wherein the operations further comprise:

accessing second recommendation data generated by the first user account and intended for the second user account:

generating second graphic data based on the second recommend data, and selecting a second location within the display of the second user account to display the second graphic data based on the increased estimated interest.

6. The system of claim 5, wherein the operations further comprise causing the second graphic data to be displayed at the second location within the display of the second user account.

7. The system of claim 1, wherein the selecting the location is based further on a number of messages exchanged between the first user account and the second user account.

8. The system of claim 1, wherein the continuous sliding scale is configured to receive user input to adjust the location of the recommendation data in the display configuration of the second user account that is displayed in the user interface of the first user account.

9. A non-transitory computer-readable medium having stored thereon machine-readable instructions that, when executed by a first client device, cause the first client device to perform operations comprising:

receiving an input from a first user account that indicates a request to provide a recommendation to a second user account, the recommendation including an image and an identifier specifying the second user account to which the recommendation is exclusively directed;

retrieving a display configuration of the second user account;

causing the display configuration of the second user account to display in a user interface of the first user account adjacent to a continuous sliding scale to allow a user of the first user account to view a location where the recommendation will be displayed relative to locations of other displayed data in the second user account;

receiving a scale position of the continuous sliding scale in the user interface of the first user account, wherein the scale position of the continuous sliding scale is associated with the location that the user of the first user account intends the recommendation to be displayed in the second user account relative to the locations of the other displayed data in the second user account;

assigning a hierarchal position to the recommendation in correlation with the scale position of the continuous sliding scale;

selecting a location among one or more locations within a display of the second user account based on the hierarchal position assigned to the recommendation, the location having a predetermined size;

selecting a portion of the image that fits within the predetermined size of the location;

generating graphic data based on the selected portion of the image; and causing the graphic data to be anonymously displayed at the location within the display of the second user account on a client device.

10. The non-transitory computer-readable medium of claim 9, wherein the one or more locations comprises borders separating each of the one or more locations of the second user account.

11. The non-transitory computer-readable medium of claim 9, wherein the operations further comprise determining a display configuration of the second user account based on the graphic data generated.

12. The non-transitory computer-readable medium of claim 9, wherein the locations of the other displayed data comprises curated data.

13. The non-transitory computer-readable medium of claim 9, wherein the operations further comprise:

receiving a selection of the graphic data from the client device;

increasing an estimated interest of the graphic data in response to the receiving the selection of the graphic data;

receiving a second input from the first user account that indicates a second request to provide a second recommendation to the second user account;

generating second graphic data based on the second recommendation;

determining a second location within the display of the second user account to display the second graphic data based on the increased estimated interest; and causing the second graphic data to be displayed in the second location on the client device.

14. The non-transitory computer-readable medium of claim 9, wherein the selecting the location is based further on a response time between messages exchanged between the first user account and the second user account.

15. A method, comprising:

accessing request data generated by a first user account, wherein the request data comprises soft recommend data of the first user account intended for a second user account, the soft recommendation data including image data and an identifier specifying the second user account to which the soft recommendation data is exclusively directed;

retrieving a display configuration of the second user account;

causing the display configuration of the second user account to display in a user interface of the first user account adjacent to a continuous sliding scale to allow a user of the first user account to view a location where the recommendation data will be displayed relative to locations of other displayed data in the second user account;

receiving a scale position of the continuous sliding scale in the user interface of the first user account, wherein the scale position of the continuous sliding scale is associated with the location that the user of the first user account intends the soft recommendation data to be displayed in the second user account relative to the locations of the other displayed data in the second user account;

based on the scale position, determining a hierarchal position of the soft recommendation data of the first user account in relation to other recommendation data from a plurality of other accounts associated with the second user account;

selecting a location among one or more locations within a display of the second user account based on the hierarchal position of the soft recommendation data of the first user account in relation to the other recommendation data from the plurality of other accounts associated with the second user account, the location having a predetermined size;

selecting a portion of the image data that fits within the predetermined size of the location;

generating graphic data based on the selected portion of the image data; and causing the graphic data to be displayed in the location within the display of the second user account on a client device enabled to access the second user account.

16. The method of claim 15, wherein generating the graphic data further comprises generating the graphic data based on one or more of preferences associated with the second user account.

17. The method of claim 15, further comprising:
receiving a selection of the graphic data from the client device;
increasing an estimated interest of the graphic data in response to the receiving the selection of the graphic data;
accessing second request data generated by the first user account, wherein the second request data comprises second soft recommend data intended for the second user account;
determining one or more second locations of the second user account based on at least the increased estimated interest;
generating second graphic data based on at least the one or more second locations determined; and
causing the second graphic data to be displayed at the one or more second locations of the second user account.

18. The method of claim 17, further comprising transmitting the second graphic data to the client device and causing the client device to display the second graphic data.

19. The method of claim 15, wherein the selecting the location is based further on a response time between messages exchanged between the first user account and the second user account.

20. The method of claim 15, further comprising:
causing the display configuration of the second user account displayed in the user interface of the first user account to change based on a user input to the scale position on the continuous sliding scale.

* * * * *